(12) United States Patent
Luo et al.

(10) Patent No.: US 11,027,234 B2
(45) Date of Patent: Jun. 8, 2021

(54) OXIDIZATION OF AMMONIA DESULFURIZATION SOLUTION

(71) Applicant: Jiangnan Environmental Protection Group Inc., Grand Cayman (KY)

(72) Inventors: Jing Luo, Nanjing (CN); Lifang Qi, Beijing (CN); Yongying Luo, Nanjing (CN)

(73) Assignee: Jiangnan Environmental Protection Group Inc., Grand Cayman (KY)

( * ) Notice: Subject to any disclaimer, the term of this patent is extended or adjusted under 35 U.S.C. 154(b) by 0 days.

(21) Appl. No.: 16/007,875

(22) Filed: Jun. 13, 2018

(65) Prior Publication Data

US 2019/0314757 A1 Oct. 17, 2019

(30) Foreign Application Priority Data

Apr. 13, 2018 (CN) .......................... 201810329999.2

(51) Int. Cl.
*B01D 53/96* (2006.01)
*C01C 1/247* (2006.01)
(Continued)

(52) U.S. Cl.
CPC ....... *B01D 53/502* (2013.01); *B01D 53/1481* (2013.01); *B01D 53/1493* (2013.01); *B01D 2252/102* (2013.01)

(58) Field of Classification Search
None
See application file for complete search history.

(56) References Cited

U.S. PATENT DOCUMENTS

| 2,810,627 | A | | 10/1957 | Johnstone et al. |
| 3,510,253 | A | * | 5/1970 | Petersen ................ B01D 53/50 |
| | | | | 423/243.06 |

(Continued)

FOREIGN PATENT DOCUMENTS

| CA | 2971655 | 8/2017 |
| CN | 1280032 A | 1/2001 |

(Continued)

OTHER PUBLICATIONS

Machine Translation of He reference: CN 102850092. (Year: 2011).*

(Continued)

*Primary Examiner* — Sheng H Davis
(74) *Attorney, Agent, or Firm* — Weiss & Arons LLP (57) ABSTRACT

Apparatus and methods for oxidizing an ammonia desulfurization solution. The apparatus may include an oxidation air system. The apparatus may include an oxidation tank. The apparatus may include in the tank, a gas-liquid dispersion enhancer. The enhancer may include a sieve plate layer that includes a sieve plate. The sieve plate layer may be one of a plurality of sieve plate layers. The plurality may include two or three sieve plate layers. The apparatus may include an oxidation enhancing device mated to the tank. The oxidation enhancing device may include an acoustic wave generating device. The oxidation enhancing device includes an ultrasonic wave generating device. The ultrasonic generating device may be configured to provide a sound intensity in the range 12 to 40 Watts/Liter. The ultrasonic generating device may be configured to provide to a liquid sound intensity in the range 12 to 40 Watts/Liter.

32 Claims, 1 Drawing Sheet

(51) Int. Cl.
  *B01D 53/50* (2006.01)
  *B01D 53/14* (2006.01)

(56) References Cited

U.S. PATENT DOCUMENTS

| | | | |
|---|---|---|---|
| 3,752,877 A | 8/1973 | Beavon | |
| 3,957,951 A * | 5/1976 | Hokanson | B01D 53/501 |
| | | | 423/243.06 |
| 3,983,217 A | 9/1976 | Muraki et al. | |
| 4,250,160 A | 2/1981 | Eakman | |
| 4,294,590 A | 10/1981 | Linde et al. | |
| 4,324,776 A | 4/1982 | Kim | |
| 4,378,977 A | 4/1983 | Linde et al. | |
| 4,552,747 A | 11/1985 | Goar | |
| 4,690,807 A * | 9/1987 | Saleem | C01C 1/245 |
| | | | 423/243.03 |
| 5,019,361 A | 5/1991 | Hakka | |
| 5,106,607 A | 4/1992 | Chopin et al. | |
| 5,362,458 A | 11/1994 | Saleem et al. | |
| 5,632,967 A | 5/1997 | Nasato | |
| 6,001,154 A * | 12/1999 | Kotake | B01D 53/504 |
| | | | 96/234 |
| 6,063,352 A | 5/2000 | Risse et al. | |
| 6,066,304 A * | 5/2000 | Freetly | B01D 53/502 |
| | | | 423/243.06 |
| 6,139,807 A | 10/2000 | Risse et al. | |
| 6,221,325 B1 | 4/2001 | Brown et al. | |
| 6,277,343 B1 | 8/2001 | Gansley et al. | |
| 6,444,185 B1 | 9/2002 | Nougayrede et al. | |
| 6,508,998 B1 | 1/2003 | Nasato | |
| 6,569,398 B2 | 5/2003 | Fenderson | |
| 6,616,908 B2 | 9/2003 | Watson et al. | |
| 6,776,974 B1 | 8/2004 | Burmaster et al. | |
| 6,991,771 B2 | 1/2006 | Duncan et al. | |
| 7,351,392 B2 | 4/2008 | Chen et al. | |
| 7,635,408 B2 | 12/2009 | Mak et al. | |
| 7,648,692 B2 | 1/2010 | Chow et al. | |
| 7,754,471 B2 | 7/2010 | Chen et al. | |
| 7,879,135 B2 | 2/2011 | Ravikumar et al. | |
| 7,910,077 B2 | 3/2011 | Chow et al. | |
| 8,178,070 B2 | 5/2012 | Wong et al. | |
| 8,206,669 B2 | 6/2012 | Schaffer et al. | |
| 8,361,432 B2 | 1/2013 | Parekh et al. | |
| 8,444,943 B2 | 5/2013 | Lamar | |
| 8,545,793 B2 | 10/2013 | Thielert | |
| 8,871,176 B2 | 10/2014 | Liu et al. | |
| 9,370,745 B2 * | 6/2016 | Xu | B01D 53/502 |
| 10,099,177 B2 * | 10/2018 | Yasuda | B01D 53/78 |
| 2003/0059352 A1 * | 3/2003 | Karras | B01D 53/504 |
| | | | 422/170 |
| 2003/0102255 A1 * | 6/2003 | Mahajan | C10G 25/003 |
| | | | 208/243 |
| 2003/0175190 A1 | 9/2003 | Duncan et al. | |
| 2004/0026336 A1 * | 2/2004 | Yuri | C02F 1/004 |
| | | | 210/748.11 |
| 2007/0248518 A1 | 10/2007 | Jung et al. | |
| 2009/0004070 A1 | 1/2009 | Chow et al. | |
| 2010/0227229 A1 * | 9/2010 | Toida | C10G 25/003 |
| | | | 429/410 |
| 2011/0195008 A1 | 8/2011 | Menzel et al. | |
| 2011/0243822 A1 | 10/2011 | Mortson | |
| 2015/0352486 A1 | 12/2015 | Xu et al. | |
| 2015/0352489 A1 | 12/2015 | Luo et al. | |

FOREIGN PATENT DOCUMENTS

| | | | |
|---|---|---|---|
| CN | 201880482 U | 6/2001 | |
| CN | 1377722 A | 11/2002 | |
| CN | 1178735 C | 4/2003 | |
| CN | 1408464 A | 4/2003 | |
| CN | 1164480 C | 9/2004 | |
| CN | 2640584 Y | 9/2004 | |
| CN | 2640585 Y | 9/2004 | |
| CN | 002643987 | * 9/2004 | |
| CN | 001544129 | * 10/2004 | |
| CN | 2668235 Y | 1/2005 | |
| CN | 1617831 A | 5/2005 | |
| CN | 2746971 Y | 12/2005 | |
| CN | 2746972 Y | 12/2005 | |
| CN | 2746973 Y | 12/2005 | |
| CN | 2754711 Y | 2/2006 | |
| CN | 1251965 C | 4/2006 | |
| CN | 2772609 Y | 4/2006 | |
| CN | 2778373 Y | 5/2006 | |
| CN | 2799059 Y | 7/2006 | |
| CN | 2799060 Y | 7/2006 | |
| CN | 1283346 C | 11/2006 | |
| CN | 1321723 C | 6/2007 | |
| CN | 101085410 A | 12/2007 | |
| CN | 201030298 Y | 3/2008 | |
| CN | 201052456 Y | 4/2008 | |
| CN | 100395006 C | 6/2008 | |
| CN | 201109711 Y | 9/2008 | |
| CN | 100428979 C | 10/2008 | |
| CN | 201129965 Y | 10/2008 | |
| CN | 201132102 Y | 10/2008 | |
| CN | 101352642 A | 1/2009 | |
| CN | 201179415 Y | 1/2009 | |
| CN | 100460045 C | 2/2009 | |
| CN | 100475313 C | 4/2009 | |
| CN | 101422693 A | 5/2009 | |
| CN | 201231130 Y | 5/2009 | |
| CN | 101579602 | * 6/2009 | |
| CN | 101524620 | 9/2009 | |
| CN | 20 320447 Y | 10/2009 | |
| CN | 201333376 Y | 10/2009 | |
| CN | 101575103 A | 11/2009 | |
| CN | 101585511 A | 11/2009 | |
| CN | 201380037 Y | 1/2010 | |
| CN | 201380038 Y | 1/2010 | |
| CN | 201380039 Y | 1/2010 | |
| CN | 201380040 Y | 1/2010 | |
| CN | 100588608 C | 2/2010 | |
| CN | 101642629 A | 2/2010 | |
| CN | 201423237 Y | 3/2010 | |
| CN | 101274750 B | 6/2010 | |
| CN | 101717659 | * 6/2010 | |
| CN | 101745303 A | 6/2010 | |
| CN | 201492952 U | 6/2010 | |
| CN | 201529487 U | 7/2010 | |
| CN | 201529488 U | 7/2010 | |
| CN | 201537456 U | 8/2010 | |
| CN | 101274196 B | 12/2010 | |
| CN | 101182926 B | 1/2011 | |
| CN | 101519192 B | 2/2011 | |
| CN | 101579600 B | 4/2011 | |
| CN | 102000490 A | 4/2011 | |
| CN | 102012034 A | 4/2011 | |
| CN | 101456541 B | 5/2011 | |
| CN | 101576261 B | 5/2011 | |
| CN | 101579602 B | 5/2011 | |
| CN | 102061206 A | 5/2011 | |
| CN | 102228777 | * 5/2011 | |
| CN | 101274204 B | 6/2011 | |
| CN | 101670231 B | 8/2011 | |
| CN | 102850092 | * 8/2011 | |
| CN | 201912884 U | 8/2011 | |
| CN | 201912885 U | 8/2011 | |
| CN | 201944861 U | 8/2011 | |
| CN | 201949808 U | 8/2011 | |
| CN | 102205202 A | 10/2011 | |
| CN | 102380305 A | 3/2012 | |
| CN | 102381685 A | 3/2012 | |
| CN | 102381686 A | 3/2012 | |
| CN | 102423597 A | 4/2012 | |
| CN | 101791517 B | 5/2012 | |
| CN | 102451604 A | 5/2012 | |
| CN | 101456540 B | 7/2012 | |
| CN | 101574614 B | 7/2012 | |
| CN | 101637685 B | 7/2012 | |
| CN | 102631827 A | 8/2012 | |
| CN | 202460375 U | 10/2012 | |
| CN | 202460420 U | 10/2012 | |

(56) References Cited

FOREIGN PATENT DOCUMENTS

| | | |
|---|---|---|
| CN | 202460438 U | 10/2012 |
| CN | 101530727 B | 11/2012 |
| CN | 101955828 B | 11/2012 |
| CN | 102211762 B | 11/2012 |
| CN | 101972592 B | 12/2012 |
| CN | 103030207 * | 12/2012 |
| CN | 202538627 U | 12/2012 |
| CN | 101934191 B | 1/2013 |
| CN | 102049186 B | 1/2013 |
| CN | 202725003 U | 2/2013 |
| CN | 202751942 U | 2/2013 |
| CN | 202754802 U | 2/2013 |
| CN | 202829575 U | 3/2013 |
| CN | 101418246 B | 4/2013 |
| CN | 103212348 * | 4/2013 |
| CN | 202912691 U | 5/2013 |
| CN | 202924730 U | 5/2013 |
| CN | 202953829 U | 5/2013 |
| CN | 103212348 | 7/2013 |
| CN | 103212349 | 7/2013 |
| CN | 10231687 B | 8/2013 |
| CN | 203159221 U | 8/2013 |
| CN | 203264545 U | 11/2013 |
| CN | 203291675 U | 11/2013 |
| CN | 102489140 B | 12/2013 |
| CN | 103418223 A | 12/2013 |
| CN | 103691278 * | 12/2013 |
| CN | 203329558 U | 12/2013 |
| CN | 103585874 A | 2/2014 |
| CN | 203612955 U | 5/2014 |
| CN | 102942162 B | 8/2014 |
| CN | 104147891 * | 8/2014 |
| CN | 203781842 U | 8/2014 |
| CN | 102910593 B | 9/2014 |
| CN | 102847431 B | 10/2014 |
| CN | 103204477 B | 10/2014 |
| CN | 103446859 B | 10/2014 |
| CN | 104138713 A | 11/2014 |
| CN | 103301732 B | 1/2015 |
| CN | 103041679 B | 2/2015 |
| CN | 103301736 B | 2/2015 |
| CN | 104368231 A | 2/2015 |
| CN | 204134465 U | 2/2015 |
| CN | 204151066 U | 2/2015 |
| CN | 102895870 B | 3/2015 |
| CN | 102923670 B | 3/2015 |
| CN | 204198421 U | 3/2015 |
| CN | 103223292 B | 4/2015 |
| CN | 104555939 A | 4/2015 |
| CN | 204233957 U | 4/2015 |
| CN | 103112831 B | 5/2015 |
| CN | 204352660 U | 5/2015 |
| CN | 103553078 * | 7/2015 |
| CN | 103301705 B | 8/2015 |
| CN | 103482583 B | 9/2015 |
| CN | 104923046 A | 9/2015 |
| CN | 104941423 A | 9/2015 |
| CN | 104946296 A | 9/2015 |
| CN | 1049227894 A | 9/2015 |
| CN | 103463949 B | 12/2015 |
| CN | 105110819 A | 12/2015 |
| CN | 105126573 A | 12/2015 |
| CN | 104353258 B | 1/2016 |
| CN | 104249995 B | 4/2016 |
| CN | 205235588 U | 5/2016 |
| CN | 205245200 U | 5/2016 |
| CN | 205252720 U | 5/2016 |
| CN | 205252721 U | 5/2016 |
| CN | 205252722 U | 5/2016 |
| CN | 205262780 U | 5/2016 |
| CN | 103822217 B | 6/2016 |
| CN | 105757688 A | 7/2016 |
| CN | 105772607 | 7/2016 |
| CN | 104555940 B | 8/2016 |
| CN | 105841168 A | 8/2016 |
| CN | 104524948 B | 9/2016 |
| CN | 205549846 U | 9/2016 |
| CN | 205562498 U | 9/2016 |
| CN | 103521060 B | 1/2017 |
| CN | 103939918 B | 1/2017 |
| CN | 104208992 B | 2/2017 |
| CN | 104258713 B | 2/2017 |
| CN | 164528659 B | 4/2017 |
| CN | 106955574 | 7/2017 |
| DE | 3733319 A1 | 9/1989 |
| DE | 102013008756 * | 5/2013 |
| EP | 165609 B1 | 6/1985 |
| EP | 212523 A2 | 3/1987 |
| JP | S47-043737 | 11/1972 |
| TW | 497985 | 8/2002 |
| WO | WO200507505 A1 | 8/2005 |
| WO | WO2005113429 A1 | 12/2005 |
| WO | WO2006113935 A2 | 10/2006 |
| WO | WO20121152919 A1 | 11/2012 |
| WO | 2015049827 * | 4/2015 |

OTHER PUBLICATIONS

Office Action issued by the Japanese Intellectual Property Office in Japanese Application No. 2017-123088, dated Apr. 16, 2018.
Google Patents English translation of CN1283346C.
Google Patents English translation of CN2640585Y.
Google Patents English translation of CN2772609Y.
Google Patents English translation of CN100428979C.
Google Patents English translation of CN201912885U.
Google Patents English translation of CN10322392A.
"Introduction to FGD for China Shenhua Coal to Liquid(CTL) Project," Jiangnan Environmental Technology, Inc., 19$^{th}$ Annual Electric Power Conference and Exhibition, Apr. 13, 2017, Chicago, Illinois.
"Advantages & Application of Efficient Ammonia-Based Desulfurization Technology," Jiangnan Environmental Technology, Inc., 19$^{th}$ Annual Electric Power Conference and Exhibition, Apr. 13, 2017, Chicago, Illinois.
Office Action issued in U.S. Appl. No. 14/829,905, dated Nov. 16, 2015.
Office Action issued in U.S. Appl. No. 14/829,905, dated Feb. 29, 2016.
Office Action issued in U.S. Appl. No. 14/829,909, dated Apr. 15, 2016.
Office Action issued in U.S. Appl. No. 14/829,909, dated Dec. 14, 2016.
Office Action issued in U.S. Appl. No. 14/829,909, dated Feb. 14, 2017.
International Search Report issued for International Application No. PCT/CN2013/074657, dated Dec. 26, 2013.
International Search Report issued for International Application No. PCT/CN2014/087887, dated Jan. 14, 2015.
Supplementary European Search Report issued in European Application No. 13882863.7, dated Mar. 11, 2016.
Examination Report issued by the Canadian Intellectual Property Office in Canadian Application No. 3,021,859, dated Feb. 13, 2019.
Google machine English translation of CN103030207A.
Wende Xiao and Zhiquan Wu, "Sulfur Dioxide Removal and Recovery," Chemical Industry Press (China), 143-145, May, 2001.
Yang Yang, "Sulfur Dioxide Emission Reduction Technology and Flue Gas Desulfurization Project," Metallurgical Industry Press (China), 184-187, Jan. 2004.
Ke Zhang, "Industrial Chemistry," Commercial Press (China), 83-85, Jan. 1958.
Xianxi Ku, "Chemical Technology," Metallurgical Industry Press (China), 37-42, May 1995.
Zhuo Nan and Zengtai Zhao, "Nitrogen Fertilizer Industry," China Industry Press (China) 20-21, Mar. 1964.
Tianqi Liu and Xiaolin Huang, "Three Waste Treatment Engineering Technical Manual (part of Exhaust Gas)," Chemical Industry Press (China), 207-208, May 1999.
Shengli Cao, "Coal Chemical Product Technology," Metallurgical Industry Press (China), 43, Jun. 2003.

(56) References Cited

OTHER PUBLICATIONS

Examination Report issued by the Canadian Intellectual Property Office, dated Apr. 29, 2019.
Search Report issued by the European Patent Office, dated Mar. 18, 2019.
Examination Report issued by the GCC Patent Office in connection with commonly-owned counterpart Patent Application No. GC 2018-35818.
Office Action issued by the Chilean Patent Office dated Nov. 11, 2019.
Partial English-Language translation of Office Action issued by the Chilean Patent Office dated Nov. 11, 2019.
Examination Report issued by the Indian Patent Office dated Dec. 2, 2019.
Communication from the Chilean Patent Office in connection with commonly-owned counterpart Chilean Patent Application No. 2018-002442, dated Apr. 20, 2020.
European Search Report received in connection with European Application No. EP 18192103, dated Feb. 20, 2019.
Communication from the GCC Patent Office in connection with commonly-owned counterpart GC Application No. GC 2018-35818, dated Jan. 16, 2020.
Office Action received from Chinese Patent Office in connection with commonly-owned counterpart Chinese Application No. 201810329999.2, dated Jul. 27, 2020.
Office Action received from Chinese Patent Office in connection with commonly-owned counterpart Chinese Application No. 201810329999.2, dated Aug. 28, 2020.
Office Action received from Chinese Patent Office in connection with commonly-owned counterpart Chinese Application No. 201810329999.2, dated Oct. 30, 2020.
Communication from the Canadian Patent Office in connection with commonly-owned counterpart Canadian Application No. CA 3,021,859, dated Nov. 7, 2019.
Office Action received from Japanese Patent Office in connection with Japanese Application No. 2018-206351.
Communication received from Chinese Patent Office in connection with commonly-owned counterpart Chinese Application No. 201810329999.2, dated Jan. 18, 2021.
Final Office Action received from Japanese Patent Office in connection with Japanese Application No. 2018-206351, dated Feb. 18, 2021.

\* cited by examiner

OXIDIZATION OF AMMONIA DESULFURIZATION SOLUTION

This application claims priority under 35 U.S.C. § 119 of Chinese Patent Application No. Application No.: 201810329999.2, filed on Apr. 13, 2018, which is hereby incorporated herein in its entirety.

TECHNICAL FIELD

The disclosure is in the technical field of environmental protection, and specifically relates to a method and a device for oxidizing a solution for ammonia desulfurization. The disclosure further relates to a method for operating the device.

BACKGROUND ART

Sulfur dioxide is discharged in different degrees in various countries in the world. In China, the emission of sulfur dioxide is large, thus impacting the environment and society. The discharged sulfur dioxide further strongly influences the ecological environment and people's health, in addition to causing economic loss.

At present, there are hundreds of relatively mature desulfurization techniques, wherein wet desulfurization process is most widely applied, and represents around 85% of total installed capacity of desulfurization in the world. Common wet flue gas desulfurization techniques include the stone-gypsum method, dual-alkali method, sodium carbonate method, ammonia method, magnesium oxide method and others. Ammonia desulfurization is a wet desulfurization process using ammonia as an absorbent, in which SO2 can be utilized for producing ammonium sulfate chemical fertilizer. This is an environmental-friendly flue gas treatment scheme with low energy consumption, high added-value and resources recycling being realizable. Chemical industry produces a large amount of available aqueous ammonia, and therefore, a superiority exists in using ammonia desulfurization for the boiler exhaust gas in chemical industries.

The ammonia desulfurization process mainly includes three processes of absorption, oxidation and concentration (crystallization), wherein sulfur dioxide is first absorbed by ammonium sulfite to obtain a mixed solution of ammonium sulfite and ammonium bisulfite, and the ammonium bisulfite therein is then subjected to neutralization by adding ammonia to obtain ammonium sulfite again. The absorption of sulfur dioxide and neutralization by adding ammonia can be simply expressed by the following chemical formulas:

$$(NH_4)_2SO_3 + H_2O + SO_2 = 2NH_4HSO_3$$

$$(NH_4)xH(2-x)SO_3 + (2-x)NH_3 = (NH_4)_2SO_3$$

During the oxidation, oxidation air is introduced into the solution so that ammonium bisulfite is oxidized to obtain ammonium bisulfate:

$$(NH4)_2SO_3 + \tfrac{1}{2}O_2 = (NH_4)_2SO_4$$

The ammonium sulfate solution is subjected to concentration, crystallization, solid-liquid separation and drying to obtain the final product ammonium sulfate.

In ammonia desulfurization, ammonia is used as an absorbent to absorb sulfur dioxide in waste gas and then produce a solution of ammonium bisulfite and ammonium sulfite. The solution is easily decomposed and is not stable, and therefore needs to be oxidized into a solution of ammonium bisulfate and ammonium sulfate. One of the major steps of ammonia desulfurization is to oxidize the ammonium bisulfite in the desulfurization absorption solution into ammonium bisulfate. If the oxidation is not sufficient, the recovery of $SO_2$ in flue gas is affected, and an aerosol is easily produced.

The oxidation of ammonium sulfite is one of the main steps of ammonia desulfurization, and is significantly different from other sulfite salts, since $NH_4^+$ at a certain concentration has a damping effect on the oxidation process. The reference Chemical Engineering Science, 2000, Volume 55, Issue 23, December 2000, Pages 5637-5641, Pergamon Press, Oxford, England, 2000, discloses that $NH_4^+$ significantly inhibits the dissolution of $O_2$ in an aqueous solution. When the salt concentration is less than 0.5 mol/L (i.e., around 5 (weight) %), the oxidation rate of ammonium sulfite increases with its concentration, whereas when beyond this limit value, the oxidation rate decreases as the concentration increases.

The oxidation process of ammonium sulfite is namely the process of combining ammonium sulfite and oxygen to produce ammonium sulfate. Ammonium sulfite at a low concentration is relatively easily oxidized, and has relatively high oxidation rate; however, in a solution with a higher concentration of ammonium sulfite or ammonium sulfate, the oxidation rate of ammonium sulfite is lower. The oxidation rate is influenced by various factors such as slurry temperature, O/S ratio, gas-liquid contact area, pH value, salt concentration, oxygen dissolution rate and the like.

A higher dissolution rate of oxygen in a solution is more advantageous for the oxidation of ammonium sulfite. The solubility of oxygen in water is very small. At standard state, every 100 $cm^3$ of water can dissolve 3.08 $cm^3$ of oxygen, and at 50° C. can dissolve 2.08 $cm^3$ of oxygen. In a solution containing high concentration of ammonium sulfate, the viscosity of the solution is much larger than water, and the solubility and dissolution rate of oxygen is lower. How to improve the utilization rate of oxygen in a solution containing ammonium sulfate and decrease the amount of oxidation air and the pressure is a problem in ammonium sulfite oxidation.

The oxidation reaction of ammonium sulfite also occurs during absorption, but the oxidation ratio is generally 40%-70% under continuous circulation because of low $O_2$ content, low temperature and slow reaction speed in flue gas. This oxidation ratio is not enough, and needs to be further improved to 90% or more for post-treatment processing. This is can be difficult. In the prior art, an oxidation tank or section, or a jet oxidizer is commonly used. Some practitioners choose to add a catalyst into the absorption solution to facilitate oxidation, but this may affect the quality of the product.

Chinese patent application for invention CN103212348A proposes a process and device for oxidizing ammonium sulfite. The device comprises an oxidation tank with a slurry discharge pump at the bottom, and further comprises: a pipeline for adding ammonia communicating with the top of the oxidation tank; an oxidation air duct arranged inside the oxidation tank and located at the bottom; and perforated plates deposited at interval in several layers arranged inside the oxidation tank and located in the middle. Here, an ammonium sulfite slurry is sent into a slurry tank, the pH value of the ammonium sulfite slurry is adjusted to 6-8 by adding aqueous ammonia, then the slurry is sent to the oxidation tank from the top of the oxidation tank, and the ammonium sulfite slurry slowly flows from the top of the oxidation tank to the bottom of the oxidation tank; the oxidation air is jetted into small bubbles via the oxidation air duct and enters an ammonium sulfate slurry, and then is brought into contact with the ammonium sulfate slurry for oxidation reaction after crushed by the perforated plates; and after the oxidation reaction is finished, the slurry is discharged by the slurry discharge pump. The perforated plates have 2-5 layers with the interval of 1-4 m between layers, and have a hole diameter of 2-20 mm, with the hole center-to-center distance being 2-5 times the hole diameter; the residence time of the ammonium sulfate slurry in the oxidation tank is 10-60 min; the air volume of the oxidation air is such that the O/S ratio during the oxidation is 2-5. The process and the device have the disadvantages that the amount of the oxidation air is large, the oxidation time is long, the oxidation ratio cannot be guaranteed, and oxidation pH is high so that ammonia escapes and an aerosol is produced.

Chinese patent application for invention CN1408464A proposes a method and a device for removing and recovering $SO_2$ in flue gas, wherein the concentration of ammonium sulfite is controlled between 0.1-5 (weight) %, most preferably between 0.5-2.0 (weight) % so as to create the conditions most beneficial to oxidation and decrease the energy consumption and investment of oxidation. Here, an oxidation reaction is performed between the resultant ammonium sulfite solution and air to obtain an ammonium sulfate solution. The pressure of the compressed air is generally 0.05-0.2 MPa (gauge pressure); the flow of the compressed air is 1-5 times, commonly 2-4 times, the theoretical amount required for oxidizing ammonium sulfite; the residence time of the oxidation reaction is generally between 1-3 hours, and most preferably around 2 hours. Under this condition, the oxidation ratio can be more than 95%. The concentration of the ammonium sulfate solution is generally 5-20 (weight) %. The process has the disadvantages that the amount of the oxidation air is large, the oxidation time is long, the oxidation ratio cannot be guaranteed, the air quality in post-treatment plant is poor, the concentration of the oxidized solution is low, the investment is large and the operating cost is high.

Chinese utility model CN206810043U proposes an ammonia desulfurization multistage oxidation tank, wherein a reflux liquid inlet is arranged in the top of the tank, an oxidized solution outlet externally connecting to a circulating pump is arranged at the bottom, and several layers of oxidation devices, comprising air distributors, oxidized solution distributors and aeration devices, are arranged inside the tank; the aeration devices include several aerators arranged on a slot plate and allowing flow through the slot plate. The aerators divide bubbles, refresh gas-liquid interfacial contact, increase liquid mass transfer efficiency and enhance oxidation effects. An oxidation ejector has the function of self-priming air, and decreasing the air consumption of a first stage oxidation system. In addition, ammonium sulfate reflux liquid is jetted below the liquid level, thus enhancing the slurry turbulence and improving oxidation efficiency. Staged oxidation is achieved by a three-stage oxidation system. This process does not disclose the oxidation conditions, the structure is complex and the investment is large.

Therefore, it is desirable to choose a more suitable oxidation process and device to decrease the investment and operating costs of an oxidation system, reach higher oxidation rates, increase ammonia recovery, and control the production of aerosol.

In the conventional art, ammonia desulfurization oxidation technique has not been mastered. It is difficult to achieve low investment and low operating costs of oxidation device, and it is difficult to reach high level oxidation effects, ammonia recovery rate and controlled aerosol production.

BRIEF DESCRIPTION OF DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Definitions

"Ammonia-bearing liquid" means a liquid comprising at least one ammonia or amine based compound, including but not limited to ammonium salts, ammonium ions (NH4+), ammonium sulfate, ammonium sulfite, and any combination thereof. The liquid may be water. The liquid may be a desulfurization solution.

"Ammonia recovery" means that fraction or percentage of ammonia added to a gas cleaning process that is subsequently captured and extracted from the process.

"Ammonia slip" means ammonia or one or more ammonia/amine bearing species that escape with the exhaust of the gas flow. The species are derived from ammonia or ammonia/amine bearing species that were added to the gas flow.

"Oxidation rate" means the percentage, calculated by mol percent, of a given material that has been converted into an identified more-oxidized species of the material. For example, in a mixture containing ammonia bearing species and sulfur oxides, if X mol % of the mixture is ammonium sulfate, Y mol % is ammonium sulfite, and Z mol % is some other ammonia, sulfur, and/or oxygen containing species with an oxidation potential greater than ammonium sulfate, because ammonium sulfate is the identified most-oxidized species, the oxidation rate of the mixture would be X mol %.

"Spray coverage" is a divergence of spray from a nozzle or an array of nozzles. The greater is the divergence, the greater is the spray coverage.

In the event that an above definition or a description stated elsewhere in this application is inconsistent with a meaning (explicit or implicit) that is commonly used, set forth in a dictionary, or stated in a source incorporated by reference into this application, the application and the claim terms in particular are understood to be construed according to the definition or description in this application, and not according to the common definition, dictionary definition, or the definition that was incorporated by reference. In the event that a claim term can only be understood if it is construed by a dictionary, a definition set forth in the Dirk-Othmer Encyclopedia of Chemical Technology, 5th Edition, 2005, (John Wiley & Sons, Inc.) shall control, if provided therein.

Apparatus and methods for oxidizing an ammonia desulfurization solution are provided. The apparatus may include an oxidation air system. The apparatus may include an oxidation tank. The oxidation tank may have an absorption liquid inlet. The oxidation tank may have an absorption liquid outlet. The oxidation tank may have an oxidation air inlet. The oxidation tank may have an oxidation air outlet.

The apparatus may include, in the tank, a gas-liquid dispersion enhancer. The enhancer may include a sieve plate layer that includes a sieve plate. The sieve plate layer may be one of a plurality of sieve plate layers. The plurality may include two or three sieve plate layers.

The enhancer may include structured packings. The enhancer may include random packings. The enhancer may include apertured plates. The enhancer may include a gas cap. The enhancer may include an aeration head.

The apparatus may include an oxidation enhancing device mated to the tank. The oxidation enhancing device may include an acoustic wave generating device. The oxidation enhancing device includes an ultrasonic wave generating device. The ultrasonic generating device may be configured to emit an ultrasonic frequency in the range 50 to 100 kHz. The frequency may be in the range 60 to 85 kHz. The ultrasonic generating device may be configured to provide a sound intensity in the range 12 to 40 Watts/Liter. The ultrasonic generating device may be configured to provide to a liquid sound intensity in the range 12 to 40 Watts/Liter. The sound intensity may be in the range 18 to 24 Watts/Liter.

The oxidation enhancing device may include an infrared ray generating device. The oxidation enhancing device may include an ultraviolet light generating device.

The oxidation enhancing device may include an electron beam generating device.

The apparatus may include a flue gas desulfurization tower washing and cooling section. The apparatus may include an air distributor disposed in the washing and cooling section. The air distributor may including a main pipe and a branch pipe that defines openings.

An opening of the openings may have an area in the range 25 to 62.5 mm$^2$. The range may be 64 to 400 mm$^2$.

The apparatus may include an oxidation air system. The apparatus may include an oxidation column that includes: an oxidation column body; an oxidation chamber in the oxidation column body, the chamber configured to provide a multi-stage air distribution that forces oxidization of the absorbing liquid; an input on the tower body for inputting absorption liquid from an ammonia desulfurization absorption tower; an outlet on the oxidation column body for providing oxidation-treated absorption liquid to the ammonia desulfurization absorption tower; an oxidation air inlet on the oxidation column body, and an oxidation air outlet on the oxidation column body. The oxidation air system may be configured to feed pressurized air into the oxidation air inlet. The oxidation air outlet may be configured to feed oxidation air into an ammonia desulfurization absorption tower. The methods may include methods for operating the apparatus. The methods may include feeding absorption solution from an ammonia desulfurization absorption tower to the oxidation tank. The methods may include supplying oxidation air from the oxidation air system to the oxidation tank. The methods may include bringing the oxidation air into contact with the absorption liquid to oxidize ammonium sulfite and ammonium bisulfite in the absorption liquid to ammonium sulfate and ammonium bisulfate. The methods may include sending a first fraction of absorption solution from the absorption liquid output to a washing and cooling section of the ammonia desulphurization absorption tower. The methods may include, in the washing and cooling section, using the first fraction, washing the flue gas. The methods may include sending a second fraction of absorption solution from the absorption liquid output to an absorption section of the desulfurization absorption tower. The methods may include sending air from the oxidation air outlet to the washing and cooling section to provide secondary oxidation of washing and cooling liquid. The methods may include; stirring the washing and cooling liquid.

The methods may include feeding absorption solution from an ammonia desulfurization absorption tower to the oxidation tank. The methods may include supplying oxidation air from the oxidation air system to the oxidation tank. The methods may include bringing the oxidation air into contact with the absorption liquid to oxidize ammonium sulfite and ammonium bisulfite in the absorption liquid to ammonium sulfate and ammonium bisulfate. The methods may include sending a first fraction of absorption solution from the absorption liquid output to a washing and cooling section of the ammonia desulfurization absorption tower. The methods may include in the washing and cooling section, using the first fraction, washing the flue gas. The methods may include sending a second fraction of absorption solution from the absorption liquid output to an absorption section of the desulfurization absorption tower. The methods may include sending air from the oxidation air outlet to the absorption section of the ammonia desulfurization absorption tower to provide secondary oxidation of the absorption solution.

The methods may include sending air from the oxidation air outlet to the absorption section of the ammonia desulfurization absorption tower to provide secondary oxidation of the absorption solution.

The methods may include sending air from the oxidation air outlet to the washing and cooling section to provide secondary oxidation of washing and cooling liquid.

The methods may include adding ammonia to the absorption solution after the absorption solution exits the absorption liquid output and before the absorption solution enters the desulfurization absorption tower.

The methods may include feeding absorption solution from an ammonia desulfurization absorption tower to the oxidation tank. The methods may include supplying oxidation air from the oxidation air system to the oxidation tank. The methods may include bringing the oxidation air into contact with the absorption liquid to oxidize ammonium sulfite and ammonium bisulfite in the absorption liquid to ammonium sulfate and ammonium bisulfate. The methods may include sending a first fraction of absorption solution from the absorption liquid output to the washing and cooling section of the ammonia desulphurization absorption tower. The methods may include, in the washing and cooling section, using the first fraction, washing the flue gas. The methods may include sending a second fraction of absorption solution from the absorption liquid output to an absorption section of the desulfurization absorption tower. The methods may include sending air from the oxidation air outlet to the washing and cooling section to provide secondary oxidation of washing and cooling liquid. The methods may include stirring the washing and cooling liquid.

The methods may include feeding absorption solution from an ammonia desulfurization absorption tower to the oxidation tank. The methods may include supplying oxidation air from the oxidation air system to the oxidation tank. The methods may include bringing the oxidation air into contact with the absorption liquid to oxidize ammonium sulfite and ammonium bisulfite in the absorption liquid to ammonium sulfate and ammonium bisulfate. The methods may include sending a first fraction of absorption solution from the absorption liquid output to the washing and cooling section of the ammonia desulphurization absorption tower. The methods may include, in the washing and cooling section, using the first fraction, washing the flue gas. The methods may include sending a second fraction of absorption solution from the absorption liquid output to an absorption section of the desulfurization absorption tower. The methods may include sending air from the oxidation air outlet to the absorption section of the ammonia desulfurization absorption tower to provide secondary oxidation of the absorption solution.

The methods may include sending air from the oxidation air outlet to the absorption sec on of the ammonia desulfurization absorption tower to provide secondary oxidation of the absorption solution.

The methods may include sending air from the oxidation air outlet to the washing and cooling section to provide secondary oxidation of washing and cooling liquid.

The methods may include adding ammonia to the absorption solution after the absorption solution exits the absorption liquid output and before the absorption solution enters the desulfurization absorption tower.

The methods may include expanding air, at an air distribution stage in a tank, against the solution; and, then, providing the solution to a plurality of different sections of a flue gas desulfurization tower.

The providing may include spraying the solution in a washing and cooling section of the tower.

The providing may include spraying the solution in an absorption section of the tower.

The providing may include spraying the solution in a washing and cooling section of the tower; and an absorption section of the tower.

The methods may include receiving the solution from the output of an absorption section of the tower.

The methods may include, before the providing, adding ammonia to the solution.

The methods may include providing air at 0.5-0.3 MPa-g ("gauge") for the expanding.

The air may be at 0.7-0.23 MPa-g.

The expanding may include distributing the air in more than one air distribution stage. The expanding may include distributing the air in no more than 6 air distribution stages. The expanding may include distributing the air in no less than 1 stage and no more than 5 stages.

The expanding may include, at the air distribution stage, passing the air through a sieve plate; and the sieve plate may define a hole having an area that is 4 to 400 $mm^2$. The area may be 9 to 225 $mm^2$. The sieve plate may have a porosity of 1 to 15%. The sieve plate may have a porosity of 1.5 to 10%.

The air distribution stage may be included in a plurality of air distribution stages. The air distribution stages may be arrayed vertically. Each of the air distribution stages may include a sieve plate having a corresponding porosity; and the porosity of the stages may increase from a bottom stage of the stages to a top stage of the stages.

The methods may include flowing the air into the tank at a rate no less than that stoichiometrically required to oxidize ammonium sulfite and ammonium bisulfite in the solution. The rate may be 1.2 to 20 times that stoichiometrically required. The rate may be 2 to 8 times that stoichiometrically required.

The methods may include circulating the solution through the tower. The methods may include feeding the solution to the tank after the solution circulates through the tower. The methods may include controlling the circulation so that, upon the feeding, the solution has: 0.1 to 8 wt % ammonium sulfite and ammonium bisulfite; and 2 to 38 wt % ammonium sulfate. The 0.1 to 8 wt % ammonium sulfite and ammonium bisulfite may be 0.2 to 5 wt %.

The methods may include selecting a volume for the tank so that the solution has an oxidation time in the oxidation tank of 5 to 90 min. The oxidation time may be 10 to 70 min.

The methods may include feeding the solution to the tank in a condition in which the solution has a first sulfite content, including only ammonium sulfite and ammonium bisulfite; and drawing the solution from the tank in a condition in which the solution has a second sulfite content, including only ammonium sulfite and ammonium bisulfite; wherein the second sulfite content is no more than 10% of the first sulfite content. The second sulfite content may be a sulfite content that is no more than 0.1% the first sulfite content. The methods may include enhancing oxidation of the solution using an oxidation enhancing device.

The methods may include reacting the absorption liquid with flue gas in a desulfurization absorption tower. The methods may include, after the reacting, transferring the absorption liquid to an oxidation column. The methods may include, after the transferring, oxidizing the absorption liquid in the oxidation column. The methods may include, after the oxidizing, returning the absorption liquid to the desulfurization absorption tower.

The oxidizing may include distributing pressurized air in multiple stages in the absorption liquid.

Some embodiments may omit features shown and/or described in connection with the illustrative apparatus. Some embodiments may include features that are neither shown nor described in connection with the illustrative apparatus. Features of illustrative apparatus and methods may be combined. For example, one illustrative embodiment may include features shown in connection with another illustrative embodiment.

The steps of illustrative methods may be performed in an order other than the order shown and/or described herein. Some embodiments may omit steps shown and/or described in connection with the illustrative methods. Some embodiments may include steps that neither shown nor described in connection with the illustrative methods. Illustrative method steps may be combined example, one illustrative method may include steps shown in connection with another illustrative method.

Embodiments may involve some or all of the features of the illustrative apparatus and/or some or all of the steps of the illustrative methods.

Illustrative apparatus and methods will now be described now with reference to the accompanying drawings in the FIGURE, which form a part hereof. It is to be understood that other embodiments may be utilized and that structural, functional and procedural modifications may be made without departing from the scope and spirit of the present disclosure.

Figure 1:
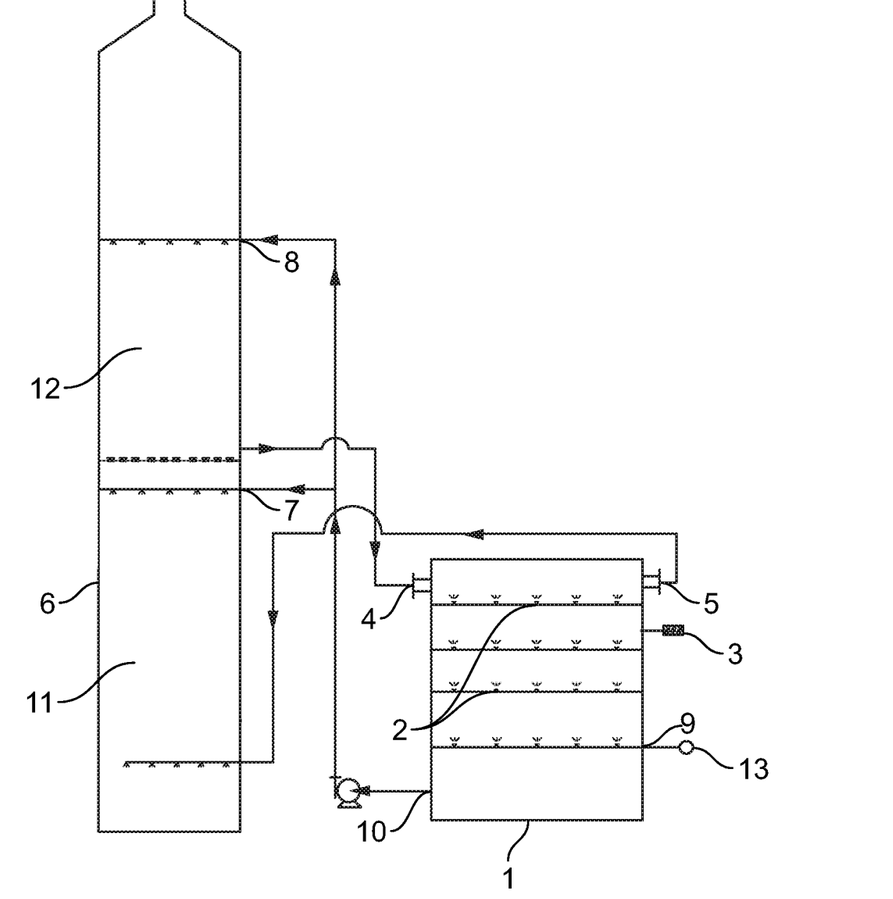
FIG. 1 shows illustrative apparatus and methods in accordance with principles of the invention.

The illustrative device shown in FIG. 1 may include oxidation air system 13 and oxidation column 1. Oxidation column 1 may include a column body. An oxidation chamber may be formed in the column body. Oxidation column 1 may include absorption solution inlet 4, oxidized solution outlet 10, oxidation air inlet 9 and oxidation air outlet 5, one or more of which may be arranged on the column body.

4 layers of gas-liquid dispersion enhancers 2 may be arranged inside oxidation column 1. The form of the gas-liquid dispersion enhancers 2 may be 2 layers of perforated plates plus 2 layers of aerators.

The device as shown in FIG. 1 may include oxidation enhancing equipment 3. Oxidation enhancing equipment may include ultrasonic wave generating equipment. The equipment may generate an ultrasonic frequency that may be 60-85 kHz, and a sound intensity that may be 20 W/L.

The pressure of the pressurized air may be 0.06-0.18 MPa (gauge pressure).

In the oxidation column, there may be four stages of air distribution.

Sieve plates may be used for air distribution stages. The sieve plates may include holes. A hole may have with an area of 121-196 mm². The open porosity of the four layers of sieve plates from the bottom to the top may be 2.1%, 2.3%, 2.3%, and 2.5% respectively.

The amount of the oxidation air may be adjusted to 4 times the theoretical amount of the oxidant required for oxidizing the ammonium bisulfite in the absorption solution.

The content of the ammonium bisulfate in the absorption solution may be adjusted to 0.5-2.5 (weight) %, and the content of ammonium bisulfate may be adjusted to 19-25 (weight) %.

The residence time of the absorption solution in the oxidation column may be 30-42 min.

The oxidized solution, which may include the oxidized absorption solution, may be supplied with ammonia or an ammonia-containing absorption solution by a static mixer before entering the absorption column for ammonia desulfurization. In contrast, in CN103212348A, ammonia is added into the slurry before the slurry enters an oxidation column, and this brings about a series of technical deficiencies related thereto: low pH is beneficial to the oxidation of ammonium sulfite; at high pH oxidation costs are high, the oxidation ratio cannot be guaranteed, and high pH slurry easily produces ammonia escape and aerosol during oxidation because of the gas stripping of air.

FIG. 1 shows illustrative ammonia desulfurization absorption column 6. Column 6 may include washing and cooling section 11 and absorption section 12. Washing and cooling section 11 may include washing and spray device 7. Absorption section 12 may include absorption and spray device 8.

The apparatus may be used to perform one or more of the following operations:

1) An absorption solution is introduced into oxidation column 1.

2) Oxidation air provided by oxidation air system 13 is introduced into oxidation column 1, brought into contact with the absorption solution, and the ammonium bisulfite in the absorption solution is oxidized into ammonium bisulfate.

3) A part of the oxidized absorption solution (or oxidized solution) is introduced into washing and spray device 7 in washing and cooling section 11, and is brought into contact with flue gas in counter-current flow so that the oxidized solution is concentrated while the flue gas is cooled and the washing and cooling section wall is rinsed. The part may, by virtue of its ammonium sulfite concentration, absorb sulfur dioxide from the flue gas.

4) A part of the oxidized absorption solution (or oxidized solution) is introduced into absorption and spray device 8 in absorption section 12, and is brought into contact with flue gas in counter-current flow so that the oxidized solution is concentrated while the flue gas is cooled and the absorption section wall is rinsed. The part may, by virtue of its ammonium sulfite concentration, absorb sulfur dioxide from the flue gas. The ammonium sulfate in the oxidation solution may reduce ammonia slip in the flue gas entrainment in the upper part of the absorption section.

5) Reacted oxidation air is sent to washing and cooling section 11 of absorption column 6 for ammonia desulfurization via oxidation air outlet 5, and the solution for washing and cooling may be subjected to secondary oxidation while the solution for washing and cooling being stirred.

The oxidation ratio of the ammonium bisulfite in the absorption solution may be controlled within 96.5%-99.5% or more according to process requirements.

An air distributor may be arranged at the washing and cooling section in the absorption column for ammonia desulfurization, and the air distributor may include a main pipe and a branch pipe, wherein the branch pipe has holes, with the hole diameter of 10-20 mm.

There may be multiple layers of gas-liquid dispersion enhancers (for example, in the form of sieve plates). The enhancers may have uniform distribution effect on the oxidation air and the absorption solution (the oxidized solution), in the oxidation column to achieve multistage oxidation (multistage circulation). In addition, a circulation of the absorption solution (the oxidized solution) may exist between the absorption column for ammonia desulfurization and the oxidation column. Multiple distribution of the oxidation air may be achieved by the gas-liquid dispersion enhancers in the oxidation column so that multiple uniform distribution of the oxidation air is achieved and the oxidation air is brought into contact with the absorption solution in counter-current flow for many times, which is beneficial to oxidation.

In the device for oxidizing the absorption solution for ammonia desulfurization as shown in FIG. 1, pressurized air with low costs may be used as the oxidation air during the oxidation process. Multistage air distribution may be used for the forced oxidation of the absorption solution to achieve a multistage circulation of the absorption solution and the oxidation air, and to achieve oxidation with high-efficiency and low-cost.

The apparatus and methods may provide oxidization of a solution for ammonia desulfurization. The oxidation may be an oxidation in which pressurized air with low costs and multistage air distribution may be used for oxidation. The oxidation may be forced. The oxidation may be an oxidation that is not forced. The oxidation may include both forced and not forced oxidation. The solution may undergo multistage circulation. The apparatus and methods may provide oxidation with high-efficiency and low-cost.

The methods may include oxidizing absorption solution for ammonia desulfurization in which:

the absorption solution is sent to the oxidation column from the absorption column for ammonia desulfurization, and the oxidized absorption solution or the oxidized solution is sent to the absorption column for ammonia desulfurization from the oxidation column, thus achieving multistage circulation of the absorption solution; and during the oxidation in the oxidation column, the pressurized air is used as the oxidation air, and a multistage air distribution is used for the forced oxidation of the absorption solution to achieve the multistage circulation of the oxidation air. The oxidation air that may complete the oxidation of the absorption solution may be sent to the absorption column for ammonia desulfurization for the secondary oxidation of the absorption solution in the absorption column for ammonia desulfurization.

The pressure of the pressurized air may be 0.05-0.3 MPa. The pressure may be 0.07-0.23 MPa. The pressure is gauge pressure, or relative pressure in relation to ambient pressure unless otherwise indicated.

The number of stages of air distribution may be 1-6. The number may be 2-5, such as 3, 4 and 5.

Sieve plates may be used in one or more air distribution stages. The sieve plates may have holes with a single-hole area of 4-400 mm². The area may be 9-225 mm², such as 50 mm², 100 mm², 150 mm² and 200 mm². The open porosity of the sieve plates may be 1%-15%. The porosity may be 1.5%-10%, such as 2%, 3%, 5%, 8% or 9%. The porosity of the sieve plates of a plurality of air distribution stages may increase in degree from the bottom to the top.

The amount of oxidation air introduced may be controlled so that the amount of the oxidation air is 1.2-2.0 times of the theoretical amount of the oxidant required for oxidizing the ammonium bisulfite in the absorption solution. The amount may be 2-8 times, such as 3, 4, 5 or 6 times.

The ingredients of the absorption solution may be controlled by the multistage circulation so that the content of the ammonium bisulfite in the absorption solution to be oxidized is 0.1-8 (weight) %. The content of the ammonium bisulfite may be 0.2-5 (weight) %. The content of ammonium sulfate may be 2-38 (weight) %.

The volume of an oxidation column may be controlled so that the oxidation time of the absorption solution in the oxidation column is 5-90 min. The oxidation time may be 10-70 min, such as 20 min, 30 min, 40 min, 50 min, 60 min and 80 min.

The oxidation ratio of the ammonium sulfite and ammonium bisulfite in the oxidized absorption solution may be controlled within 90%-99.9% or higher.

The oxidation of the absorption solution in the oxidation column may be enhanced by oxidation enhancing equipment.

The apparatus may include a device that includes an oxidation air system, an oxidation system that includes an oxidation column (tank), and the oxidation column including a column body, wherein an oxidation chamber is formed in the column body, and an absorption solution inlet, an oxidized solution outlet, an oxidation air inlet and an oxidation air outlet are arranged on the column body.

The apparatus may include a device that includes an oxidation air system and an oxidation column, which includes a column body, wherein an oxidation chamber is formed in the column body; an absorption solution inlet for introducing the absorption solution to be oxidized, an oxidized solution outlet for discharging the oxidized absorption solution, an oxidation air inlet and an oxidation air outlet are arranged on the column body; the oxidation air system is connected to the oxidation air inlet; and the oxidation air outlet is connected to the absorption column for ammonia desulfurization, characterized in that:

the device is configured such that the absorption solution is sent to the oxidation column from the absorption column for ammonia desulfurization, and the oxidized absorption solution or the oxidized solution is sent to the absorption column for ammonia desulfurization from the oxidation column, thus achieving multistage circulation of the absorption solution; and the oxidation air system s configured such that during the oxidation in the oxidation column, the pressurized air is used as the oxidation air, and a multistage air distribution is used for the forced oxidation of the absorption solution to achieve multistage circulation of the oxidation air. The oxidation air that may complete the oxidation of the absorption solution may be sent to the absorption column for ammonia desulfurization for the secondary oxidation of the absorption solution in the absorption column for ammonia desulfurization.

1, 2, 3 or more layers of gas-liquid dispersion enhancers may be arranged in the oxidation column. The form of the gas-liquid dispersion enhancers may include any one or a combination of any number of structured packings, random packings, perforated plates, gas caps and aerators.

The device may include oxidation enhancing equipment, and the oxidation enhancing equipment may include any one or a combination of any number of an acoustic wave generating equipment, an ultrasonic wave generating equipment, an infrared ray generating equipment, an ultraviolet light generating equipment and an electron beam generating equipment.

An air distributor may be arranged at the washing and cooling section in the absorption column for ammonia desulfurization, and the air distributor may include a main pipe and a branch pipe, wherein the branch pipe has holes, with a single hole area of 25-625 mm$^2$. The hole area may be 64-400 mm$^2$, such as 50 mm$^2$, 100 mm$^2$, 150 mm$^2$, 200 mm$^2$, 250 mm$^2$, 300 mm$^2$, 350 mm$^2$, 400 mm$^2$, 450 mm$^2$, 500 mm$^2$.

The methods may include a method for operating the apparatus such that:

1) the absorption solution to be oxidized from the absorption column for ammonia desulfurization is sent to the oxidation column;

2) the pressurized oxidation air provided by the oxidation air system is introduced into the oxidation column, wherein the oxidation air is brought into contact with the absorption solution, and the ammonium sulfite and ammonium bisulfite in the absorption solution are oxidized into ammonium sulfate and ammonium bisulfate;

3) after adding ammonia to the oxidized absorption solution, a part is sent to the washing and cooling section in the absorption column for ammonia desulfurization for spray, and the washing and cooling section is rinsed, and the other part is sent to the absorption section of the absorption column for ammonia desulfurization;

4) the reacted oxidation air is sent to the washing and cooling section and/or absorption section of the absorption column for ammonia desulfurization, wherein where sending to the washing and cooling section of the absorption column for ammonia desulfurization, the solution for washing and cooling is subjected to secondary oxidation while the solution for washing and cooling being stirred.

All the technical features disclosed herein can be combined in any form that is technically feasible.

EXAMPLE

An illustrative Example involving the apparatus and methods is set forth below.

During the oxidation process, pressurized air with low costs and multistage air distribution was used for forced oxidation of the absorption solution to achieve a multistage circulation and to achieve oxidation with high-efficiency and low-cost.

The pressure of the pressurized air was 0.105 MPa.

The number of stages of the air distribution was 3.

Sieve plates were used for air distribution stages, the sieve plates included holes with a single-hole area of 16-64 mm$^2$. The open porosity of the three layers of sieve plates from the bottom to the top was 5.2%, 5.3% and 5.5% respectively.

The addition amount of the oxidation air was 5.2 times of the theoretical amount of the oxidant required for oxidizing the ammonium bisulfite in the absorption solution.

The content of the ammonium bisulfite in the absorption solution was 0.3-1 (weight) %, and the content of ammonium sulfate was 20-23 (weight) %.

The oxidation time was 52 min.

The device included an oxidation air system 13 and an oxidation column 1, and the oxidation column 1 included a column body, wherein an oxidation chamber was formed in the column body, and an absorption solution inlet 4, an oxidized solution outlet 10, an oxidation air inlet 9 and an oxidation air outlet 5 were arranged on the column body.

3 layers of gas-liquid dispersion enhancers 2 were arranged inside the oxidation chamber. The form of the gas-liquid dispersion enhancers 2 was 2 layers of perforated plates+1 layer of structured packings.

The device included oxidation enhancing equipment, and the oxidation enhancing equipment was an ultraviolet light generating equipment.

The absorption solution inlet 4 and the oxidized solution outlet 10 were provided with a plug valve respectively, and the material of the through-flow part of the valve was 316 stainless steel lined with fluoroplastic.

Operation of the apparatus included the following:

1) An absorption solution was introduced into the oxidation column 1.

2) The oxidation air provided by the oxidation air system 13 was introduced into the oxidation air inlet 9 of the oxidation column, brought into contact with the absorption solution, and the ammonium bisulfite in the absorption solution was oxidized into ammonium bisulfate.

3) A part of the oxidized absorption solution (or oxidized solution) was introduced into the washing and spray device 7 in the washing and cooling section 11 in the absorption column 6 for ammonia desulfurization, and brought into contact with flue gas in counter-current flow so that the oxidized solution was concentrated while the flue gas being cooled, and the wall of the column and the support beam were rinsed; and the other part was supplied with ammonia and introduced into the absorption and spray device 8 in the absorption section 12 of the absorption column 6 for ammonia desulfurization.

4) The reacted oxidation air was sent to the absorption section 12 of the absorption column 6 for ammonia desulfurization via the oxidation air outlet 5.

The oxidation ratio of the ammonium bisulfite in the absorption solution was 97.5%-99%.

The washing and cooling section 11 in the absorption column 6 for ammonia desulfurization was provided with a stirrer.

The amount of the treated boiler flue gas was 500,000 $Nm^3/h$ (standard state, wet basis, and actual oxygen); $SO_2$ concentration was 1750 $mg/Nm^3$, the oxidation column diameter was 5.6 m and the height was 10.5 m; and the flow of the oxidized solution entering the oxidation column was 650 $m^3/h$.

Illustrative Embodiments

A. A method for oxidizing a solution for ammonia desulfurization, characterized in that during the oxidation process, pressurized air with low costs and multistage air distribution are used for forced oxidation of the absorption solution to achieve a multistage circulation and to achieve oxidation with high-efficiency and low-cost.

B. The method of embodiment A, characterized in that ammonia is supplied before an oxidized solution enters an absorption column for ammonia desulfurization.

C. The method of embodiment A or B, characterized in that the pressure of the pressurized air is 0.05-0.3 MPa, and preferably 0.07-0.23 MPa.

D. The method of any one of embodiments A to C, characterized in that the stage number of the air distribution is 1-6, and preferably 2-5.

E. The method of any one of embodiments A to D, characterized in that sieve plates are used in one or more air distribution stages, and the sieve plates have holes with a single hole area of 4-400 $mm^2$ and preferably 9-225 $mm^2$.

F. The method of embodiment F, characterized in that the open porosity of the sieve plates is 1%-15%, and preferably 1.5%-10%, and particularly preferably the open porosity of the sieve plates of the plurality of air distribution stages increase by degrees from the bottom to the top.

G. The method of any one of embodiments A to F, characterized in that the oxidation air introduced is controlled so that the addition amount of the oxidation air is 1.2-20 times of the theoretical amount of the oxidant required for oxidizing the ammonium sulfite and ammonium bisulfite in the absorption solution, and preferably 2-8 times.

H. The method of any one of embodiments A to G, characterized in that the circulation of the absorption solution is controlled so that in the absorption solution to be subjected to oxidization, the content of the ammonium sulfite and ammonium bisulfite is 0.1-8 (weight) %, the content of ammonium sulfate is 2-38 (weight) %, and preferably the content of the ammonium sulfite and ammonium bisulfite is 0.2-5 (weight) %.

I. The method of any one of embodiments A to H, characterized in that the volume of an oxidation column is controlled so that the oxidation time of the absorption solution in the oxidation column is 5-90 min, and preferably 10-70 min; and/or the oxidation ratio of the ammonium sulfite and ammonium bisulfite in the oxidized absorption solution is controlled within 90%-99.9% or higher.

J. The method of any one of embodiments A to I, characterized in that the oxidation of the absorption solution in the oxidation column is enhanced by an oxidation enhancing equipment.

K. A device for oxidizing a solution for ammonia desulfurization, characterized by comprising an oxidation air system and an oxidation system, the oxidation system comprising an oxidation column (tank), and the oxidation column comprising a column body, wherein an oxidation chamber is formed in the column body, and an absorption solution inlet, an oxidized solution outlet, an oxidation air inlet and an oxidation air outlet are arranged on the column body.

L. The device of embodiment K, characterized in that 1, 2, 3 or more layers of gas-liquid dispersion enhancers are arranged in the oxidation column; and the form of the gas-liquid dispersion enhancers is preferably any one or a combination of any number of structured packings, random packings, perforated plates, gas caps and aerators.

M. The device of embodiment K or L, characterized in that the device further comprises an oxidation enhancing equipment; and the oxidation enhancing equipment is preferably any one or a combination of any number of an acoustic wave generating equipment, an ultrasonic wave generating equipment, an infrared ray generating equipment, an ultraviolet light generating equipment and an electron beam generating equipment.

N. The device of embodiment M, characterized in that the ultrasonic frequency of the ultrasonic wave generating equipment is 50-100 kHz, and preferably 60-85 kHz, and the sound intensity is 12-40 W/L, and preferably 18-24 W/L.

O. The device of any one of embodiments K to N, characterized in that an air distributor is arranged at the washing and cooling section in the absorption column for ammonia desulfurization, and the air distributor comprises a main pipe and a branch pipe, wherein the branch pipe has holes, with a single hole area of 25-625 $mm^2$, and preferably 64-400 $mm^2$.

P. A method for operating the device of any one of embodiments 11 to 15, characterized in that the method comprises the following process steps:

1) the absorption solution to be oxidized from the absorption column for ammonia desulfurization is sent to the oxidation column;

2) the pressurized oxidation air provided by the oxidation air system is introduced into the oxidation column, wherein the oxidation air is brought into contact with the absorption solution, and the ammonium sulfite and ammonium bisulfite in the absorption solution are oxidized into ammonium sulfate and ammonium bisulfate;

3) a part of the oxidized solution is sent to the washing and cooling section in the absorption column for ammonia desulfurization for spray, and the washing and cooling section is rinsed, and the other part is sent to the absorption section of the absorption column for ammonia desulfurization;

4) the reacted oxidation air is sent to the washing and cooling section and/or absorption section of the absorption column for ammonia desulfurization, wherein where sending to the washing and cooling section of the absorption column for ammonia desulfurization, the solution for washing and cooling is subjected to secondary oxidation while the solution for washing and cooling is stirred.

Q. The method of embodiment P, characterized in that the method further comprises the following process step: the oxidized solution in step 3 is supplied with ammonia before entering the absorption section.

R. A method for oxidizing the absorption solution for ammonia desulfurization, characterized in that the absorption solution is sent to the oxidation column from the absorption column for ammonia desulfurization, and the oxidized solution is sent to the absorption column for ammonia desulfurization from the oxidation column, thus realizing the multistage circulation of the absorption solution; and during the oxidation in the oxidation column, the pressurized air is used as the oxidation air, and a multistage air distribution is used for forced oxidation of the absorption solution to achieve the multistage circulation of the oxidation air.

S. A device for oxidizing the absorption solution for ammonia desulfurization, comprising an oxidation air system and an oxidation column, and the oxidation column comprising a column body, wherein an oxidation chamber is formed in the column body; an absorption solution inlet for introducing the absorption solution to be oxidized, an oxidized solution outlet for discharging the oxidized absorption solution, an oxidation air inlet and an oxidation air outlet are arranged on the column body; the oxidation air system is connected to the oxidation air inlet; and the oxidation air outlet is connected to the absorption column for ammonia desulfurization, characterized in that the device is configured such that the absorption solution is sent to the oxidation column from the absorption column for ammonia desulfurization, and the oxidized solution is sent to the absorption column for ammonia desulfurization from the oxidation column, thus realizing the multistage circulation of the absorption solution; and the oxidation air system is configured such that during the oxidation in the oxidation column, the pressurized air is used as the oxidation air, and a multistage air distribution is used for the forced oxidation of the absorption solution to achieve the multistage circulation of the oxidation air.

1. Apparatus for oxidizing an ammonia desulfurization solution, the apparatus comprising:
   an oxidation air system; and
   an oxidation tank having:
      an absorption liquid inlet;
      an absorption liquid outlet;
      an oxidation air inlet; and
      an oxidation air outlet.

2. The apparatus of embodiment 1 further comprising, in the tank, a gas-liquid dispersion enhancer.

3. The apparatus of embodiment 2 wherein the enhancer includes a sieve plate layer that includes a sieve plate.

4. The apparatus of embodiment 3 wherein the sieve plate layer is one of a plurality of sieve plate layers.

5. The apparatus of embodiment 4 wherein the plurality includes two or three sieve plate layers.

6. The apparatus of embodiment 2 wherein the enhancer includes structured packings.

7. The apparatus of embodiment 2 wherein the enhancer includes random packings.

8. The apparatus of embodiment 2 wherein the enhancer includes apertured plates.

9. The apparatus of embodiment 2 wherein the enhancer includes gas caps.

10. The apparatus of embodiment 2 wherein the enhancer includes aeration heads.

11. The apparatus of embodiment 2 wherein the enhancer includes a feature selected from the group consisting of:
   structured packings;
   random packings;
   apertured plates;
   gas caps;
   aeration heads; and
   a combination of one or more of the foregoing features.

12. The apparatus of embodiment 2 wherein the enhancer includes structured packings, random packings, apertured plates, gas caps, and aeration heads.

13. The apparatus of embodiments 1 or 2 further comprising an oxidation enhancing device mated to the tank.

14. The apparatus of embodiment 13 wherein the oxidation enhancing device includes an acoustic wave generating device.

15. The apparatus of embodiment 13 wherein the oxidation enhancing device includes an ultrasonic wave generating device.

16. The apparatus of embodiment 15 wherein the ultrasonic generating device is configured to emit an ultrasonic frequency in the range 50 to 100 kHz.

17. The apparatus of embodiment 16 wherein:
   the frequency is in the range 60 to 85 kHz; and
   the ultrasonic generating device is configured to provide a sound intensity in the range 12 to 40 Watts/Liter.

18. The apparatus of embodiment 17 wherein the sound intensity is in the range 18 to 24 Watts/Liter.

19. The apparatus of embodiment 13 wherein the oxidation enhancing device includes an infrared ray generating device.

20. The apparatus of embodiment 13 wherein the oxidation enhancing device includes an ultraviolet light generating device.

21. The apparatus of embodiment 13 wherein the oxidation enhancing device includes an electron beam generating device.

22. The apparatus of embodiment 13 wherein the oxidation enhancing device includes a feature selected from the group consisting of:

an acoustic wave generating device;
an ultrasonic wave generating device;
an infrared ray generating device;
an ultraviolet light generating device;
an electron beam generating device; and
a combination of one or more of the foregoing features.

23. The apparatus of any of embodiments 1 to 16 further comprising:
a flue gas desulfurization tower washing and cooling section; and
an air distributor disposed in the washing and cooling section, the air distributor including a main pipe and a branch pipe that defines openings.

24. The apparatus of embodiment 23 opening of the openings has an area in the range 25 to 625 mm².

25. The apparatus of embodiment 24 wherein the range is 64 to 400 mm².

26. Apparatus for oxidizing an ammonia desulfurization absorption liquid, the apparatus comprising:
an oxidation air system; and
an oxidation column that includes:
an oxidation column body;
an oxidation chamber in the oxidation column body, the chamber configured to provide a multi-stage air distribution that forces oxidization of the absorbing liquid;
an input on the tower body for inputting absorption liquid from an ammonia desulfurization absorption tower;
an outlet on the oxidation column body for providing oxidation-treated absorption liquid to the ammonia desulfurization absorption tower;
an oxidation air inlet on the oxidation column body, and
an oxidation air outlet on the oxidation column body; wherein:
the oxidation air system is configured to feed pressurized air into the oxidation air inlet;
the oxidation air outlet is configured to feed oxidation air into an ammonia desulfurization absorption tower.

27. A method for operating the apparatus any of embodiments 1 to 16, the method comprising:
feeding absorption solution from an ammonia desulfurization absorption tower to the oxidation tank;
supplying oxidation air from the oxidation air system to the oxidation tank;
bringing the oxidation air into contact with the absorption liquid to oxidize ammonium sulfite and ammonium bisulfite in the absorption liquid to ammonium sulfate and ammonium bisulfate;
sending a first fraction of absorption solution from the absorption liquid output to a washing and cooling section of the ammonia desulphurization absorption tower;
in the washing and cooling section, using the first fraction, washing the flue gas;
sending a second fraction of absorption solution from the absorption liquid output to an absorption section of the desulfurization absorption tower;
sending air from the oxidation air outlet to the washing and cooling section to provide secondary oxidation of washing and cooling liquid; and
stirring the washing and cooling liquid.

28. A method for operating the apparatus of any of embodiments 1 to 16, the method comprising:
feeding absorption solution from an ammonia desulfurization absorption tower to the oxidation tank;
supplying oxidation air from the oxidation air system the oxidation tank;
bringing the oxidation air into contact with the absorption liquid to oxidize ammonium sulfite and ammonium bisulfite in the absorption liquid to ammonium sulfate and ammonium bisulfate;
sending a first fraction of absorption solution from the absorption liquid output to a washing and cooling section of the ammonia desulfurization absorption tower;
in the washing and cooling section, using the first fraction, washing the flue gas;
sending a second fraction of absorption solution from the absorption liquid output to an absorption section of the desulfurization absorption tower;
sending air from the oxidation air outlet to the absorption section of the ammonia desulfurization absorption tower to provide secondary oxidation of the absorption solution.

29. The method of embodiment 27 further comprising sending air from the oxidation air outlet to the absorption section of the ammonia desulfurization absorption tower to provide secondary oxidation of the absorption solution.

30. The method of embodiment 8 further comprising sending air from the oxidation air outlet to the washing and cooling section to provide secondary oxidation of washing and cooling liquid.

31. The method of any of embodiments 27 to 30 further comprising adding ammonia to the absorption solution after the absorption solution exits the absorption liquid output and before the absorption solution enters the desulfurization absorption tower.

32. A method for operating the apparatus of embodiment 23, the method comprising:
feeding absorption solution from an ammonia desulfurization absorption tower to the oxidation tank;
supplying oxidation air from the oxidation air system to the oxidation tank;
bringing the oxidation air into contact with the absorption liquid to oxidize ammonium sulfite and ammonium bisulfite in the absorption liquid to ammonium sulfate and ammonium bisulfate;
sending a first fraction of absorption solution from the absorption liquid output to the washing and cooling section of the ammonia desulphurization absorption tower;
in the washing and cooling section, using the first fraction, washing the flue gas;
sending a second fraction of absorption solution from the absorption liquid output to an absorption section of the desulfurization absorption tower;
sending air from the oxidation air outlet to the washing and cooling section to provide secondary oxidation of washing and cooling liquid; and
stirring the washing and cooling liquid.

33. A method for operating the apparatus of embodiment 23, the method comprising:
feeding absorption solution from an ammonia desulfurization absorption tower to the oxidation tank;
supplying oxidation air from the oxidation air system to the oxidation tank;
bringing the oxidation air into contact with the absorption liquid to oxidize ammonium sulfite and ammonium bisulfite in the absorption liquid to ammonium sulfate and ammonium bisulfate;

sending a first fraction of absorption solution from the absorption liquid output to the washing and cooling section of the ammonia desulphurization absorption tower;

in the washing and cooling section, using the first fraction, washing the flue gas;

sending a second fraction of absorption solution from the absorption liquid output to an absorption section of the desulfurization absorption tower;

sending air from the oxidation air outlet to the absorption section of the ammonia desulfurization absorption tower to provide secondary oxidation of the absorption solution.

34. The method of embodiment 32 further comprising sending air from the oxidation air outlet to the absorption section of the ammonia desulfurization absorption tower to provide secondary oxidation of the absorption solution.

35. The method of embodiment 33 further comprising sending air from the oxidation air outlet to the washing and cooling section to provide secondary oxidation of washing and cooling liquid.

36. The method of any of embodiments 32 to 35 further comprising adding ammonia to the absorption solution after the absorption solution exits the absorption liquid output and before the absorption solution enters the desulfurization absorption tower.

37. A method for oxidizing an ammonia-bearing desulfurization solution, the method comprising:
expanding air, at an air distribution stage in a tank, against the solution; and, then,
providing the solution to a plurality of different sections of a flue gas desulfurization tower.

38. The method of embodiment 37 wherein the providing includes spraying the solution in a washing and cooling section of the tower.

39. The method of embodiment 37 wherein the providing includes spraying the solution in an absorption section of the tower.

40. The method of embodiment 37 wherein the providing includes spraying the solution in:
a washing and cooling section of the tower; and
an absorption section of the tower.

41. The method of embodiment 37 further comprising receiving the solution from the output of an absorption section of the tower.

42. The method of embodiment 37 further comprising, before e providing, adding ammonia to the solution.

43. The method of embodiment 37 or 6 further comprising providing air at 0.5-0.3 MPa-g for the expanding.

44. The method of embodiment 43 wherein the air is at 0.7-0.23 MPa-g.

45. The method of any of embodiments 37 to 43 wherein the expanding includes distributing the air in more than one air distribution stage.

46. The method of any of embodiments 37 to 43 wherein the expanding includes distributing the air in no more than 6 air distribution stages.

47. The method of embodiment 46 wherein the expanding includes distributing the air in no less than 1 stage and no more than 5 stages.

48. The method of any of embodiments 37 to 45 wherein:
the expanding includes, at the air distribution stage, passing the air through a sieve plate; and
the sieve plate defines a hole having an area that is 4 to 400 mm$^2$.

49. The method of embodiment 48 wherein the area is 9 to 225 mm$^2$.

50. The method embodiments 48 or 49 wherein the sieve plate has a porosity of 1 to 15%.

51. The method embodiments 48 or 49 wherein the sieve plate has a porosity of 1.5 to 10%.

52. The method of embodiments 50 or 51 wherein:
the air distribution stage is included in a plurality of air distribution stages;
the air distribution stages are arrayed vertically;
each of the air distribution stages includes a sieve plate having a corresponding porosity; and
the porosity of the stages increase from a bottom stage to a top stage.

53. The method of any of embodiments 37 to 50 further comprising flowing the air into the tank at a rate no less than that stoichiometrically required to oxidize ammonium sulfite and ammonium bisulfite in the solution.

54. The method of embodiment 53 wherein the rate is 1.2 to 20 times that stoichiometrically required.

55. The method of embodiment 54 wherein the rate is 2 to 8 times that stoichiometrically required.

56. The method of any of embodiments 37 to 53 further comprising:
circulating the solution through the tower;
feeding the solution to the tank after the solution circulates through the tower; and
controlling the circulation so that, upon the feeding, the solution has:
0.1 to 8 wt % ammonium sulfite and ammonium bisulfite; and
2 to 38 wt % ammonium sulfate.

57. The method of embodiment 56 wherein the 0.1 to 8 wt % ammonium sulfite and ammonium bisulfite is 0.2 to 5 wt %.

58. The method of any of embodiments 37 to 56 further comprising selecting a volume for the tank so that the solution has an oxidation time in the oxidation tank of 5 to 90 min.

59. The method of embodiment 58 wherein the oxidation time is 10 to 70 min.

60. The method of any of embodiments 37 to 56 further comprising:
feeding the solution to the tank in a condition in which the solution has a first sulfite content, including only ammonium sulfite and ammonium bisulfite; and
drawing the solution from the tank in a condition in which the solution has a second sulfite content, including only ammonium sulfite and ammonium bisulfite;
wherein the second sulfite content is no more than 10% of the first sulfite content.

61. The method of embodiment 60 wherein the second sulfite content is no more than 0.1% of the first sulfite content.

62. The method of any of embodiments 37 to 58 further comprising enhancing oxidation of the solution using an oxidation enhancing device.

63. A method for oxidizing an ammonia desulfurization absorption liquid, the method comprising:
reacting the absorption liquid with flue gas in a desulfurization absorption tower;
after the reacting, transferring the absorption liquid to an oxidation column;
after the transferring, oxidizing the absorption liquid in the oxidation column; and,
after the oxidizing, returning the absorption liquid to the desulfurization absorption tower.

64. The method of embodiment 63 wherein the oxidizing includes distributing pressurized air in multiple stages in the absorption liquid.

Thus, apparatus and methods for oxidizing an ammonia desulfurization solution have been provided. Persons skilled in the art will appreciate that the present invention can be practiced by other than the described examples, which are presented for purposes of illustration rather than of limitation. The present invention is limited only by the claims that follow.

What is claimed is:

1. A method for oxidizing an ammonia-bearing desulfurization solution, the method comprising:
   feeding the desulfurization solution to a tank;
   providing pressurized air to the tank;
   then, expanding the air, at an air distribution stage in the tank, against the desulfurization solution, wherein the distribution stage is configured to force oxidization of the desulfurization solution;
   oxidizing the desulfurization solution by means of the expanding to produce oxidized solution;
   exiting the oxidized solution from the tank via an absorption liquid outlet of the tank;
   then, adding ammonia to, and thereby increasing the ammonia content of the oxidized solution,
   then, providing the oxidized solution to a plurality of different sections of a flue gas desulfurization tower, the providing the oxidized solution including:
   sending a first fraction of the oxidized solution from the absorption liquid outlet to a washing and cooling section of the tower and spraying the oxidized solution in the washing and cooling section; and
   sending a second fraction of the oxidized solution from the absorption liquid outlet to an absorption section of the tower and spraying the oxidized solution in the absorption section;
   then, reacting, in the absorption section, the oxidized solution with a flue gas and circulating resultant reacted solution through the tower; and
   controlling the circulating so that, after the circulating and upon the feeding, circulated solution has:
   0.1 to 8 wt % ammonium sulfite and ammonium bisulfite; and 2 to 38 wt % ammonium sulfate.

2. The method of claim 1 further comprising receiving the desulfurization solution to be fed into the tank from an output of the absorption section of the tower after the reacting in the absorption section.

3. The method of claim 1 further comprising flowing the air into the tank at a rate no less than that stoichiometrically required to oxidize ammonium sulfite and ammonium bisulfate in the solution.

4. The method of claim 1 further comprising sending air to the absorption section of the tower to provide secondary oxidation of the reacted solution, the secondary oxidation provided external to the tank.

5. The method of claim 4 wherein the air is sent from an oxidation air outlet of the tank.

6. The method of claim 1 further comprising selecting a volume for the tank so that the solution has an oxidation time in the tank of 5 to 90 min.

7. The method of claim 1 wherein the air is pressurized at 0.05-0.3 MPa (gauge).

8. The method of claim 1 wherein the tank is mated to the tower.

9. The method of claim 1 wherein the tank is disposed separate from the tower.

10. The method of claim 1 wherein the air distribution stage is a second to sixth stage of a multi-stage distribution.

11. A method for oxidizing an ammonia-bearing desulfurization solution, the method comprising: expanding air, at an air distribution stage in a tank, against the desulfurization solution, the air distribution stage configured to produce oxidation of the solution;
   enhancing the oxidation of the solution using an oxidation enhancing device;
   oxidizing the solution by the expanding and the enhancing, to produce oxidized solution;
   after the enhancing:
   exiting the oxidized solution from the tank via an absorption liquid outlet of the tank;
   then, adding ammonia to, and thereby increasing the ammonia content of the oxidized solution;
   then, providing the oxidized solution to a plurality of different sections of a flue gas desulfurization tower, the different sections including an absorption section;
   after the providing, reacting, in the absorption section, the oxidized solution with a flue gas, producing reacted solution; and,
   after the reacting, feeding the reacted solution to the tank.

12. The method of claim 11 further comprising flowing the air into the tank at a rate no less than that stoichiometrically required to oxidize ammonium sulfite and ammonium bisulfite in the reacted solution.

13. The method of claim 12 wherein the rate is 1.2 to 20 times that stoichiometrically required.

14. The method of claim 11 further comprising selecting a volume for the tank so that the desulfurization solution has an oxidation time in the tank of 5 to 90 minutes.

15. The method of claim 11 further comprising, after the reacting, receiving the reacted solution into the tank from an output of the absorption section of the tower.

16. The method of claim 11 wherein the oxidation enhancing device is mated to the tank.

17. The method of claim 11 wherein the oxidation enhancing device includes an acoustic wave generating device.

18. The method of claim 11 wherein the oxidation enhancing device includes an ultrasonic wave generating device.

19. The method of claim 18 wherein the ultrasonic generating device is configured to emit an ultrasonic frequency in the range 50 to 100 kHz.

20. The method of claim 19 wherein:
   the frequency is in the range 60 to 85 kHz; and
   the ultrasonic generating device is configured to provide a sound intensity in the range 12 to 40 Watts/Liter.

21. The method of claim 20 wherein the sound intensity is in the range 18 to 24 Watts/Liter.

22. The method of claim 11 wherein the oxidation enhancing device includes an infrared ray generating device.

23. The method of claim 11 wherein the oxidation enhancing device includes an ultraviolet light generating device.

24. The method of claim 11 wherein the oxidation enhancing device includes an electron beam generating device.

25. The method of claim 11 wherein the oxidation enhancing device includes a feature selected from the group consisting of:
   an acoustic wave generating device;
   an ultrasonic wave generating device;
   an infrared ray generating device;
   an ultraviolet light generating device;
   an electron beam generating device; and
   a combination of two or more of the foregoing features.

26. The method of claim 11 wherein the providing includes spraying the oxidized solution in a washing and cooling section of the tower.

27. The method of claim 11 wherein the providing includes spraying the oxidized solution in the absorption section of the tower.

28. The method of claim 11 further comprising sending air to the absorption section of the tower to provide secondary oxidation of the reacted solution.

29. The method of claim 11 wherein the oxidation enhancing device is configured to force oxidization of the solution.

30. The method of claim 29 wherein the oxidation enhancing device is a multi-stage gas distributor.

31. The method of claim 11 wherein the tank is disposed separate from the tower.

32. A method for oxidizing an ammonia-hearing desulfurization solution, the method comprising:

expanding air, at an air distribution stage in a tank, against the desulfurization solution, the air distribution stage configured to produce oxidation of the solution;

oxidizing the desulfurization solution by means of the air distribution stage to produce oxidized solution;

after the oxidizing, exiting the oxidized solution from the tank via an absorption liquid outlet of the tank;

then, adding ammonia to, and thereby Increasing the, ammonia content of the oxidized solution:

then, providing the oxidized solution to a plurality of different sections of a flue gas desulfurization tower, the different sections including an absorption section;

after the providing, reacting, in the absorption section, the oxidized solution with a flue gas, producing reacted solution; and, after the reacting, feeding the reacted solution to the tank.

* * * * *